US010237217B1

(12) United States Patent
Reeves et al.

(10) Patent No.: US 10,237,217 B1
(45) Date of Patent: Mar. 19, 2019

(54) CONTROLLING ACCESS TO CONTENT BASED ON ACCESS NETWORK TYPE

(71) Applicant: Sprint Communications Company, L.P., Overland Park, KS (US)

(72) Inventors: Raymond Emilio Reeves, Oviedo, FL (US); Simon Youngs, Overland Park, KS (US); Bee Sayaxong Lee, Kansas City, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 426 days.

(21) Appl. No.: 13/958,338

(22) Filed: Aug. 2, 2013

(51) Int. Cl.
*H04L 12/58* (2006.01)
*H04L 29/06* (2006.01)

(52) U.S. Cl.
CPC ...... *H04L 51/063* (2013.01); *H04L 29/06469* (2013.01)

(58) Field of Classification Search
CPC .............................. H04L 12/58; H04L 29/06
See application file for complete search history.

(56) References Cited

U.S. PATENT DOCUMENTS

| | | | | |
|---|---|---|---|---|
| 6,351,771 B1* | 2/2002 | Craddock | ............... | H04L 41/00 370/352 |
| 2004/0127215 A1* | 7/2004 | Shaw | ...................... | H04L 29/06 455/432.1 |
| 2004/0174853 A1* | 9/2004 | Saito | ..................... | H04W 88/06 370/338 |
| 2006/0075467 A1* | 4/2006 | Sanda | ................... | G06F 21/316 726/1 |
| 2006/0229069 A1* | 10/2006 | Bindel | ................ | H04W 72/048 455/426.2 |
| 2007/0143827 A1* | 6/2007 | Nicodemus | ......... | G06F 21/6218 726/2 |
| 2008/0125067 A1* | 5/2008 | Bells | ....................... | H04W 4/00 455/187.1 |
| 2008/0195664 A1* | 8/2008 | Maharajh | .......... | G06F 17/30035 |
| 2010/0329243 A1* | 12/2010 | Buckley | ................ | H04W 48/18 370/352 |
| 2011/0225417 A1* | 9/2011 | Maharajh | ................ | G06F 21/10 713/150 |
| 2011/0289136 A1* | 11/2011 | Klassen | ............. | H04N 1/32101 709/203 |
| 2014/0022898 A1* | 1/2014 | Kim | ........................ | H04W 8/22 370/230 |

OTHER PUBLICATIONS

Managing Network Bandwidth to Maximize Performance, ©2007 Fluke Corporation, 6 pages.

* cited by examiner

*Primary Examiner* — June Y Sison

(57) ABSTRACT

A user's access to online content is controlled based at least in part on the type of access network utilized to access the content. When a request is received from a user via an access network to access online content, the access-network type and the content type are determined. A determination of a portion of the content to communicate to the user is made based on one or more policies that control access to the identified content type when transmitted via the identified access-network type, and the determined portion of the content is communicated to the user.

10 Claims, 5 Drawing Sheets

CONTROLLING ACCESS TO CONTENT BASED ON ACCESS NETWORK TYPE

SUMMARY

A high-level overview of various aspects of the invention are provided here for that reason, to provide an overview of the disclosure and to introduce a selection of concepts that are further described in the detailed description section below. This summary is not intended to identify key features or essential features of the claimed subject matter, nor is it intended to be used as an aid in isolation to determine the scope of the claimed subject matter. In brief and at a high level, this disclosure describes, among other things, ways to provide transcoder-free operation by predicting which type of codec a target mobile device is likely to accommodate.

In a first aspect, computer-readable media are provided for performing a method of controlling access to content. A request is received from a user via an access network to access online content. An access-network type associated with the access network is identified. A content type associated with the content identified. A portion of the content to communicate to the user is determined based on one or more policies that control access to the identified content type when transmitted via the identified access-network type. The determined portion of the content is then communicated to the user.

In a second aspect, computer-readable media are provided for performing a method of controlling access to content communicated by a carrier to a user. Identification of a type of content associated with content requested for download by a user is received. Identification of a type of access network utilized by the user to request the message is received. A user preference is identified for controlling access to the identified type of content when downloaded via the identified type of access network. A provider preference is identified for controlling access to the identified type of content when downloaded via the identified type of access network. An amount of the requested content is communicated to the user. The amount communicated is based on one or more of the user preference or the provider preference.

In a third aspect, computer-readable media are provided for performing a method of controlling access to a message. A request is received from a user via an access network to view a message stored at a message service. A determination is made as to whether the message is one or more of a low-value message or a high-risk message. When the message is one or more of a low-value message or a high-risk message, then a preferred type of access network is identified to utilize for delivering the message. A determination is made as to whether the user is accessing the message service via the preferred type of access network. When the user is accessing the message service via the preferred type of access network, then the message is sent to the user. When the user is not accessing the message service via the preferred type of access network, then the user's access to the message is restricted.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

1xRTT Single Channel Radio Transmission Technology
CDMA Code division Multiple Access
GIF Graphics Interchange Format
GIS Geographic Information System
GPRS General Packet Radio Service
GSM Global System for Mobile Communications
HRPD High Rate Packet Data (1xEVDO)
IP Internet Protocol
ISP Internet Service Provider
MIME Multipurpose Internet Mail Extensions
MMS Multimedia Message Service
PDA Personal Data Assistant
RCS Rich Communications Service
SMS Short Message Service
SSID Service Set Identifier
TDMA Time division Multiple Access
WiMAX Wireless Microwave Access
WLAN Wireless Local-Area Network
WWAN Wireless Wide-Area Network Embodiments of our technology may include, among other things, a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information readable by a computing device. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
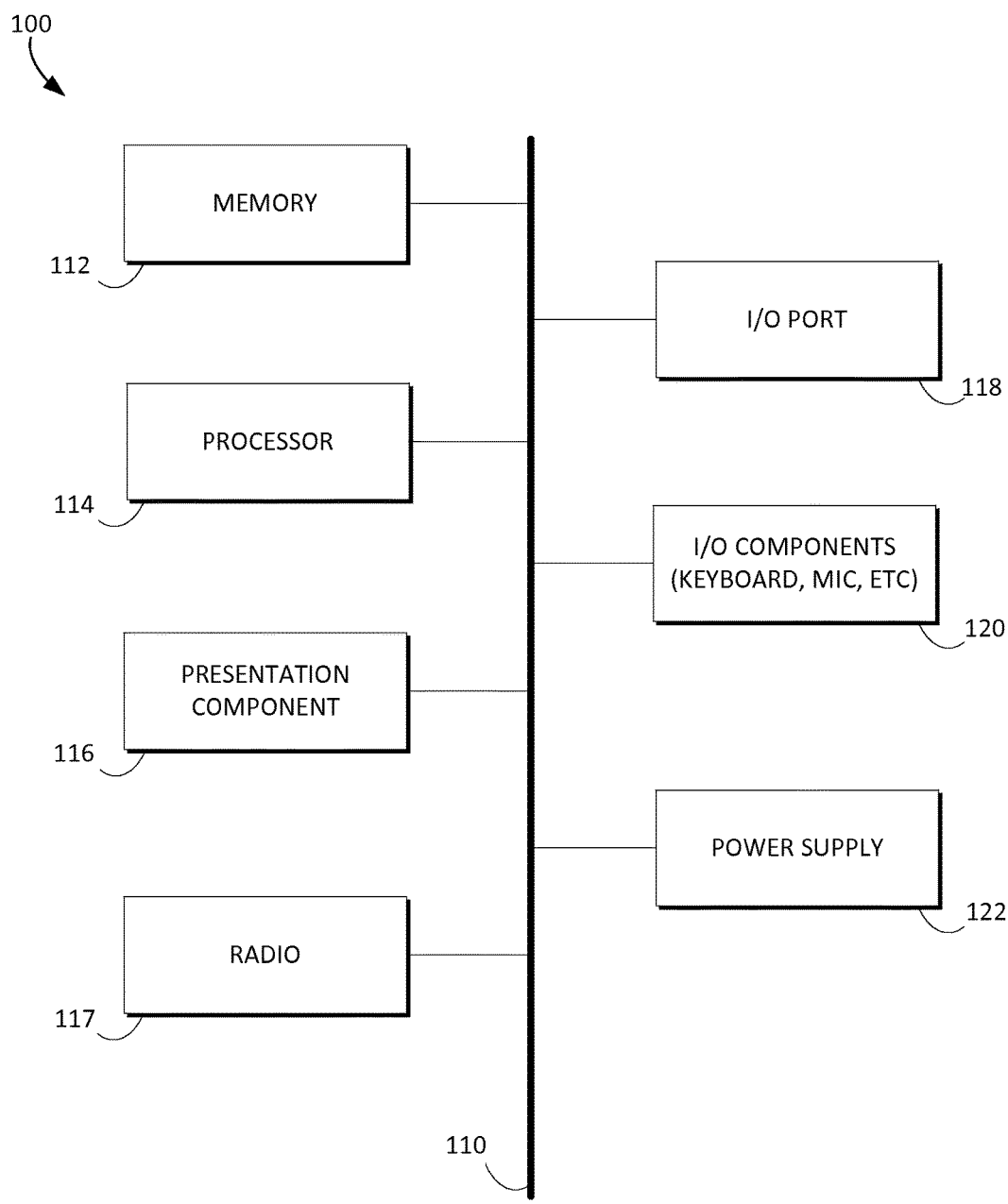
FIG. 1 depicts a block diagram of an illustrative mobile computing device in accordance with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, and other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, HRPD, 1×RTT, and the like. In some embodiments, radio 117 might also facilitate other types of wireless communications including Wi-Fi, WiMAX, and GIS communications. A mobile device may include multiple radios 117, for example, one radio 117 may utilize a technology such as CDMA, while a second radio 117 may utilize Wi-Fi, enabling the mobile device to access different types of networks.

Input/output ports 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

One example of mobile device 100 includes a cell phone. Other examples of mobile device 100 include personal digital assistants (PDAs), wireless-enabled laptop computers, gaming systems, electronic books, electronic tablets, and other devices as described above regarding mobile device 100 of FIG. 1 that are capable of communicating with a telecommunications network and/or other type of network.

A mobile device such as mobile device 100 may access online content via a number of types of access networks. Examples of access networks include cellular networks, Wireless Local Access Networks such as Wi-Fi, and Wide-Area Local Access Networks such as WiMAX, among others. Different types of access networks may have dissimilar operating characteristics that impact delivery of content to a user. For example, bandwidth and data rate may vary from one type of access network to another. Additionally, different types of access networks may be associated with different types of access fees, subscriptions, usage costs, and other characteristics associated with entities such as access providers, service providers, and carriers, among others. Costs associated with using an access network may be incurred by a mobile device user and/or the user's mobile carrier and other providers.

Devices that connect with networks, including mobile devices such as mobile device 100, may receive large numbers of messages from various sources. The number and size of messages can contribute significantly to the volume of traffic and data communicated over a carrier's network. Reducing or eliminating the number and/or size of messages delivered to users via a carrier's network can result in more efficient usage of the carrier network's bandwidth and data capacity.

For example, a video presentation typically includes a large amount of data. A user subscribing with a carrier may access a messaging service via the carrier's cellular access network and download a message that includes or triggers a video presentation. The video presentation consumes some given amount of bandwidth in the carrier's access network, and likely in the carrier's core network as well. On the other hand, when the user accesses the messaging service via a public Wi-Fi access network, such as in a coffee shop, then the video presentation is delivered via the public Wi-Fi access network rather than the carrier's access network. In that event, the video presentation consumes no bandwidth on the carrier's cellular access network. If the messaging service is associated with a provider other than the carrier, then bandwidth and data consumption in the carrier's core network may also be reduced.

Reducing or eliminating the number and/or size of messages delivered to users via a carrier's network can also increase user satisfaction with the carrier. For example, when the user downloads a large message via the carrier's access network, the user may incur additional fees based on his or her data plan. But when connecting via a public Wi-Fi access network, the user may avoid the additional fees.

The quality of a user's experience when accessing messages can be affected by the type of access network. For example, the 1×RTT communication protocol, which is the core CDMA2000 standard, is generally not adequate for high-bandwidth data such as a video presentation. If the user roams to another carrier's cellular access network utilizing 1×RTT and accesses a message that includes a video presentation, the user will likely be displeased with the quality of the presentation. By either limiting the user's access to only a small portion of the message, such as a subject line or a thumbnail image, or not even giving the user an indication that a video message is available, the carrier enables the user to make better use of his or her time by downloading messages that are not bandwidth intensive when accessing messages via a 1×RTT network.

The types of content to which access is restricted may be determined based on a user's past behavior with regard to various types of messages. Some types of messages can be determined to be of low value to a user. Low-value messages may not necessarily be spam per se, but may simply be of no interest to the user. For example, the user may download certain types of messages and never view them, or delete them without even downloading them. A user may also delete or ignore messages from certain senders. On the other hand, the user may consistently read certain other types of messages, which would suggest that those types of message are of more value to the user. Based on a user's usage patterns, a learned user profile can be developed to classify various types of messages and/or message content with regard to whether the content is likely to be of value to the user. As an example, messages may be classified as low value and high value. Other classification schemes may also be used, such as three or more levels of classification (e.g., low, medium, and high value), among others.

Messages may also be classified based on user preferences. For example, if a user has 100 messages on a messaging server, the customer might prefer to first receive the messages that could be downloaded quickly (e.g., small messages), and receive the remaining messages toward the end. Means can be provided to the user to select a preference for prioritizing the order in which messages on the server are downloaded to the user's device. Additionally, a user might specify that certain types of messages (e.g., video presentations), should not be presented over a 1×RTT access network, or that certain types of messages should only be presented over a free public Wi-Fi access network.

In addition to classifying types of content according to value, messages may also be classified with regard to a risk level. The term "risk" in this context does not necessarily imply a risk of data loss, as might be the case with messages containing viruses or other malware. Risk could be assigned based on a potential financial risk to the user and/or the carrier. For example, a user may subscribe to an unlimited data plan with the user's carrier. In that case, a large video may be downloaded by the user via the carrier's access network without incurring additional financial costs. But if the user were to roam into another carrier's network, the user could incur a substantial fee to download the video via the other carrier's access network. Large video files (or potentially any type of large file or content) could be classified as "risky" with respect to access networks that have usage fees associated with them.

Risk could also be assigned based on a physical or safety risk to the user. For example, some types of content require interaction with the user, or may command the user's attention, such as with a video presentation or video chat. Some vehicles today include data network connectivity, and may include a terminal such as an in-dashboard terminal. It could be unsafe to deliver highly interactive content to an in-dashboard terminal while the terminal is in an on-the-road state. In that case, the risk level would be a physical risk, or safety risk, based on the combination of the content type (e.g., requiring interaction) and the state of the access network, i.e., in an on-the-road vehicle.

Risk could also be assigned based on parental controls. A vehicle with network connectivity may include a terminal viewable from the back seat. If a parent selects a preference that R-rated content is undesirable in the van, given that children are likely to view the terminal, content may be flagged as high risk if the access network is in a van and the content is an R-rated video, for example.

Content may be classified as risky from the carrier's viewpoint based on the size or bandwidth requirements of the content. A large video presentation, for example, may be classified as high risk because of the potential to consume a large amount of the carrier's bandwidth, the potential to cost the user excessive usage fees, or a cost to the carrier to utilize another carrier's network to deliver the content, as well as other situations. Although the carrier may be able to recoup some costs by passing them along to the user, the carrier may also benefit from customer satisfaction by offering the service of restricting access to a video presentation, for example, when it would cost the user additional fees. Such a service could be promoted as beneficial to the user.

Similarly to value-level classification, content may be classified as low risk and high risk. Other schemes using more classification levels may also be used, such as low, medium, and high risk, among others.

Restricting access to content based on access-network type requires knowledge of the type of access network utilized by the user. The carrier may generate an access-network registry, or database, that cross references access-network identifiers with access network types. An access point (e.g., a router or gateway) associated with an access network has an identifier uniquely associated with the access network. In the case of a Wi-Fi network, the access network identifier may be the service set identifier (SSID) name associated with the Wi-Fi network. As another example, an access network identifier may be a network address, such as an Internet Protocol (IP) address, of the access point, or by other types of identifiers.

When a mobile device attempts to connect with a messaging server, the carrier may store the access-network identifier utilized during the session into the access-network registry, or into a separate registry or database, thus keeping a record of the access network utilized by the mobile device during the current session. When the mobile device connects with an application server or message server, the access network identifier can be used to identify the type of the access network from the access-network registry. Knowing the type of access network utilized by the mobile device, the carrier can control the device's access to content, based on factors such as those described above.

Figure 2:
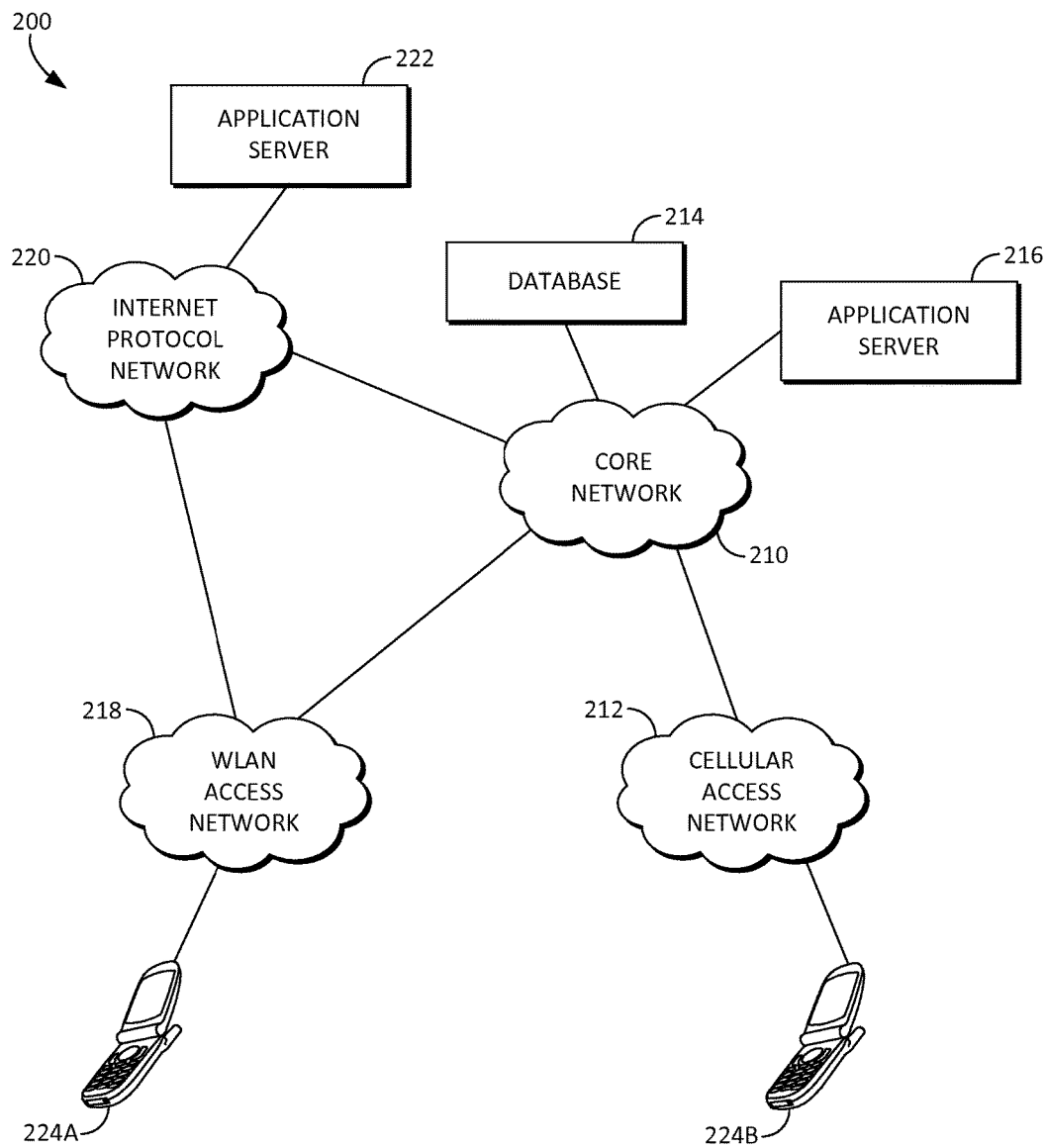
FIG. 2 depicts a simplified diagram of a network environment suitable for use in accordance with an embodiment of the present invention.

Referring now to FIG. 2, a simplified diagram is depicted of a network environment suitable for use in accordance with an embodiment of the present invention, generally referred to as network environment 200. Network environment 200 includes a core network 210, a cellular access network 212, a database 214, an application server 216, a WLAN access network 218, an Internet Protocol (IP) network 220, an application server 222, and mobile device 224 (depicted as 224A and 224B to illustrate access via different access networks).

Core network 210 may be a telecommunications network associated with a telecommunications provider, or carrier, such as a mobile telecommunications network. However, core network 210 is not limited to a mobile telecommunications network, but may include other types of networks as well. Core network 210 has associated with it a cellular access network 212. Although access network 212 is depicted as a cellular access network, in some embodiments, access network 212 may be some other type of access network. For example, in one embodiment, core network 210 may be associated with an Internet service provider (ISP), and access network 212 may be a WiMAX access network associated with the ISP.

Core network 210 may have associated with it database 214, which in one embodiment stores information related to access network types and classifications of content types as described above. Core network 210 may also have associated with it application server 216. In one embodiment, application server 216 is a message server. Examples of message servers include an email server, a voicemail server, a short message service center (SMSC), a multimedia messaging service center (MMSC), and a rich communications services (RCS) server, among others. In one embodiment, application server 216 provides a user with access to online content, such as audio files, video files, and electronic books, to name a few. In an embodiment, a message can have various types of content embedded within the message, such as an embedded video presentation or a graphic file. In another embodiment, application server 216 may host content that is referenced in a message hosted at a messaging server. For example, an email message stored on a message server may include a link to a video that is stored on application server 216.

Network environment 200 also includes a wireless local area network (WLAN) 218. WLAN 218 is an access network that may provide a user with access to core network 210 and services provided by core network 210. WLAN may be associated with core network 210; however, WLAN 218 may instead be associated with another entity, such as an ISP. Examples of WLAN 218 include a Wi-Fi network, among others, and may also include a WiMAX network, even though a WiMAX network may be considered a wireless wide-area network (WWAN).

Network environment 200 also includes IP network 220, which in some embodiments includes the Internet, but may also be an IP network other than the Internet. In an embodiment, IP network 220 is accessible via WLAN 218, and may also be accessible via cellular access network 212, by way of core network 210.

Application server 222, which is accessible at least via IP network 220, may be similar in nature to application server 216, i.e., may be a messaging server or may host other types of content that is accessible to a user. However, application server 222 may be associated with an entity other than core network 210. For example, application server 222 may be associated with an ISP, a music provider, a video provider, or other types of content, data, or service providers.

Network environment 200 also includes mobile device 224, depicted as 224A and 224B to illustrate access via different access networks. Mobile device 224 may be associated with core network 210, such that the user of mobile device 224 has a subscription with the carrier associated with core network 210. Mobile device 224 may access core network 210 and/or other services at least via cellular access network 212 and/or WLAN 218. For example, mobile device 224 may be associated with an email account hosted at application server 216, and may access email messages at application server 216 either via cellular access network 212 or via a Wi-Fi connection via WLAN 218. Similarly, mobile device 224 may access email and other services at application server 216, application server 222, and other application servers.

Figure 3:
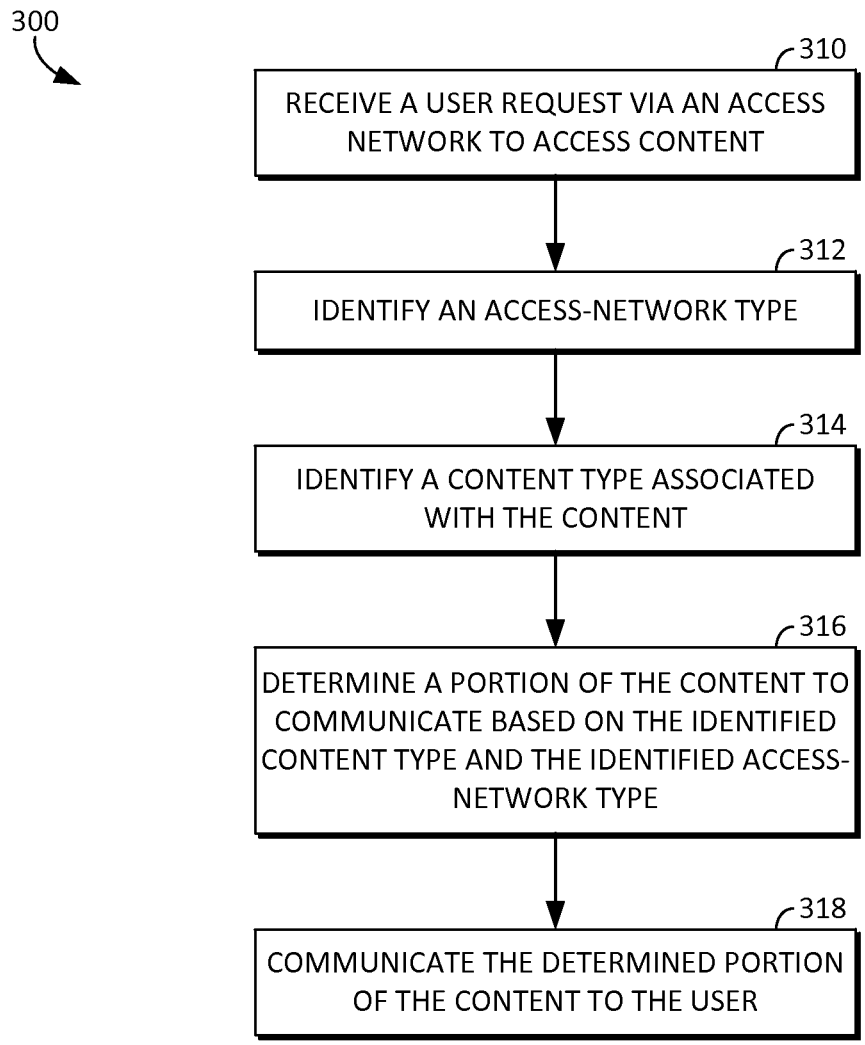
FIG. 3 depicts a flowchart of a method for controlling access to content suitable for use in accordance with an embodiment of the present invention.

Referring now to FIG. 3, a flowchart is depicted of a method for controlling access to content suitable for use in accordance with an embodiment of the present invention, and is generally referred to as method 300.

At a step 310, a request is received from a user, via an access network, to access online content. In the context of network environment 200 of FIG. 2, the request may be received via mobile device 224. In one embodiment, the user has an email account hosted on application server 216, and the request is to download a message from the user's email account. In another embodiment, the request is to access a video. Other types of content may be accessed as well, including music, voicemail, audio chat, video chat, and instant messaging, among others. Some types of content may be stored or hosted on an application server, while other types of content may be generated by a service provider, such as the case with video chat.

At a step 312, the type of access network being utilized by the user to access the online content is identified. In one embodiment, the type of the access network is identified by obtaining an access network identifier associated with the access network, and using the identifier to reference a registry, or database, that maps access network identifiers with access network types. As described above, some examples of access network types include cellular networks, Wireless Local Access Networks such as Wi-Fi, and Wide-Area Local Access Networks such as WiMAX, among others.

At a step 314, the type of the online content being requested is determined. As described above, some examples of content types include video, audio, email, voicemail, audio chat, video chat, and instant messaging, among others. Other examples of content types include messages identified as originating from a particular sender, and content that is classified or typed based on size without necessarily any regard to the type of data in the content. For example, any document or data file that is larger than a threshold size may be classified as a "large type" of content, regardless of whether it is a text document, an image file, or other type of file. Content types may also include various types of content ratings, such as "PG" and "R" ratings with respect to videos, for example. Content types may also be based on a level of user attention or interaction commanded by the content.

In one embodiment, the content is associated with a message stored on a message server, and the content type is determined by accessing a Multipurpose Internet Mail Extensions (MIME) type associated with the message and/or the content. In another embodiment, content type may be determined based on metadata associated with the file or document containing the content. For example, files and documents typically include, or are associated with, metadata that identify properties of the file or document, such as size, data format, data type, file type, author, and date of creation, among others. The content type in one embodiment of the invention may be determined based on one or more metadata items such as size, data format, data type, and file type, among others.

At a step 316, a portion of the content to communicate to the user is determined based on policies that control access to the identified content type when transmitted via the identified access-network type. For example, in one embodiment, if a particular type of content is voluminous, or requires a high-bandwidth connection, such as a video presentation, and the user is connected via a relatively slow access network, such as 1×RTT, then the determination could be to send only a small portion of the content, perhaps a representative thumbnail, or even none of the content. On the other hand, if the user is connected via a relatively high-speed access network, then the determination could be to send the entire content to the user.

In another embodiment, if a particular type of content is labeled as high-value content, the determination could be to communicate the content to the user regardless of the access-network type. Content may be labeled as high-value, for instance, if the content is known to be of importance to the user, either by a specified user preference, or learned based on the user's past behavior with regard to that type of content, or by other means.

The portion of the content to communicate to the user may also be determined based on the risk level associated with a particular type of content. As described above, a risk level may be based on one or more of several factors, such as financial cost to the user, financial cost to the carrier, size of the content, the type of user device, the context in which the user device is utilized, safety considerations, and presence of mature content, among others. The risk level associated with a particular type of content may vary, depending on the type of access network being utilized. For example, a very large file might incur substantial cost to the user if delivered while the user is utilizing another carrier's access network, but not incur any cost if delivered via a public Wi-Fi network. Thus, the content may be considered to have a high level of risk with respect to the other carrier's access network, but have a low level of risk with respect to the public Wi-Fi network. The risk level may also vary depending on the data rate or bandwidth of the access network, the type of device being utilized by the user, and other considerations. Some examples include content that would not present well on a mobile phone, but would be appropriate to present on a tablet device or a laptop computer; a video presentation that would play properly over a high-bandwidth connection, but not over a low-bandwidth connection; and an interactive presentation that would be appropriate to present on a mobile phone, but not on an in-dash terminal in a moving vehicle. In one embodiment, determining the portion of the content to communicate includes accessing a Multipurpose Internet Mail Extensions (MIME) type associated with the content, and identifying a preferred access-network type specified by the MIME type.

The portion of content that is determined to be communicated to the user may include the entire content, a description of the content, a limited portion of the content, a modified portion of the content, a header portion of the content, or no portion of the content. In one embodiment, if the content is very large and the access network is slow, a description of the content may be sent to the user instead of the entire content. Alternately, a limited or modified portion of the content may be sent to the user, such as a short segment of a large video presentation, a representative thumbnail image based on a frame of the video presentation, a thumbnail image of a large image file, or a few lines of text from a large document, among others. Sending a description or limited/modified portion of the content gives the user an opportunity to decide whether or not the entire content should be sent. In some embodiments, the user is not given the opportunity to receive the entire content.

Figure 4:
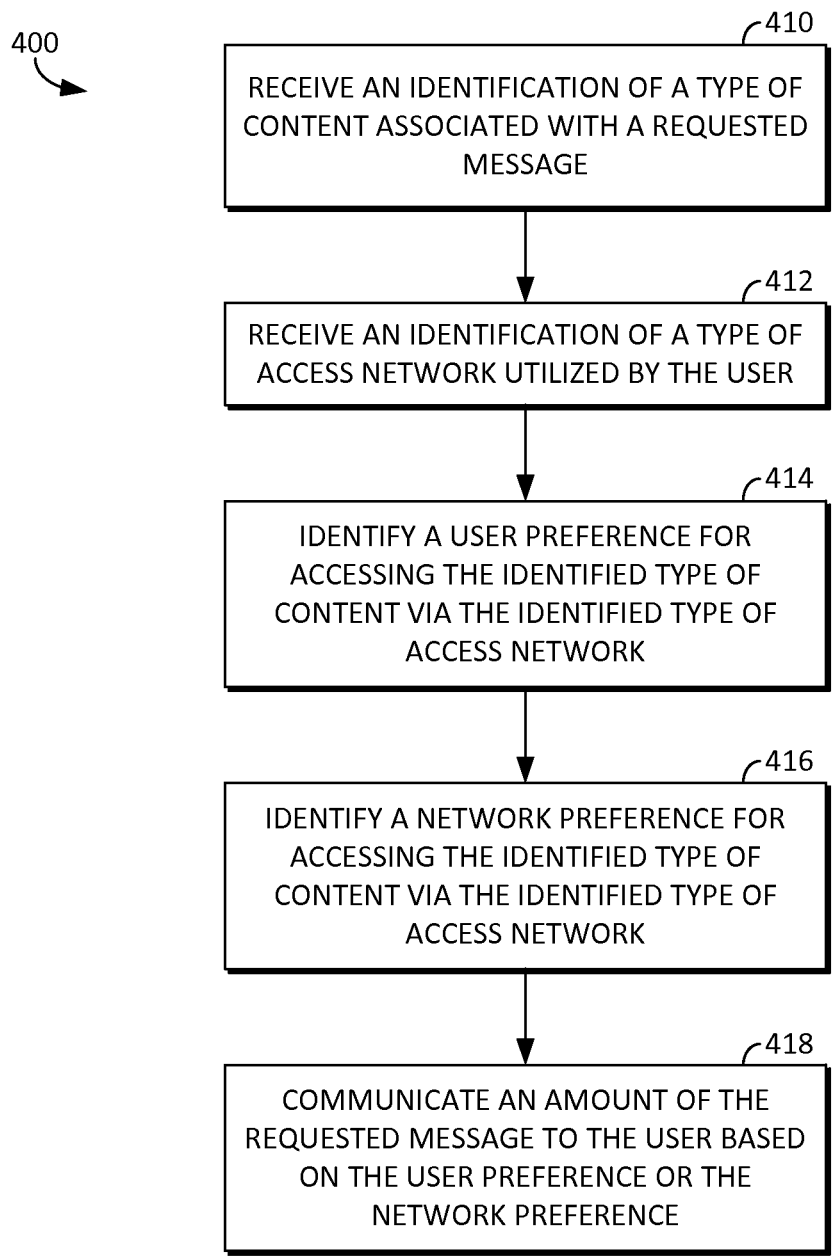
FIG. 4 depicts a flowchart of a method for controlling access to content suitable for use in accordance with an embodiment of the present invention.

Referring now to FIG. 4, a flowchart is depicted of a method for controlling access to content suitable for use in accordance with an embodiment of the present invention, and is generally referred to as method 400.

At a step 410, an identification is received of a type of content associated with content requested by a user. In one embodiment, the identification is received at an application server that hosts or stores the requested message. The application server may obtain the content type by examining metadata associated with a stored message that includes the content, or may access a database or other source to determine the content type. In some embodiments, the application server hosts a specific type of content, and thus knows by default the content type of all hosted content. In one embodiment, the application server may be part of, or associated with, the user's carrier network, as is the case with application server 216 depicted in FIG. 2. In another embodiment, the application server may be associated with another entity, such as another service or content provider, as is the case with application server 222 depicted in FIG. 2.

At a step 412, an identification is received of the type of access network utilized by the user to access the content. In an embodiment, the application server hosting the content first determines the identity of the access network. As described above, an access network may be identified by a unique identifier, such as an SSID in the case of a Wi-Fi network, or an IP address of an access point, among others. The access-network identifier may be used by the application server to search a registry or database that cross-references specific access networks with access-network types. The registry or database may be maintained by the application server or separately from the application server. In one embodiment, the user's telecommunications carrier maintains the registry and makes the registry available to the application server, such as by authorizing the application server to access the registry, or by providing a copy of the registry to the application server. In another embodiment, the application server maintains the registry or database.

At a step 414, a user preference is identified for accessing the identified type of content via the identified type of access network. In an embodiment, user preferences are maintained in a user profile. The user profile may include preferences explicitly specified by the user, preferences that have been determined based on the user's past behavior with regard to previous content having the same content type, or a combination of both. One example of a preference specified by a user is a preference that a message having particular Multipurpose Internet Mail Extensions (MIME) type should only be delivered via a particular type of access network.

In one embodiment, the user's telecommunications carrier maintains the user profile and makes the user profile available to an application server or other entity that identifies the user preference. In one embodiment, the carrier utilizes the user profile to identify the user preference. It may be that the user profile does not contain a user preference for accessing the identified type of content via the identified type of access network. In that event, identifying the user preference could include identifying that there is no preference.

At a step 416, a provider preference, specified by the provider network or carrier, is identified for accessing the identified type of content via the identified type of access network. In an embodiment, as described above, the provider preference may include restricting access to voluminous or high-bandwidth content when the user is utilizing the network's own access network. Alternatively, the provider preference may include granting unrestricted access to voluminous high-bandwidth content when the user is utilizing a public access network such as Wi-Fi. Determining the provider preference may also include identifying a risk level of the content, as described above, and determining whether delivering the type of content via the identified type of access network would pose a risk from the network's perspective. In the event that there is no provider preference for accessing the identified type of content via the identified type of access network, then identifying the provider preference could include identifying that there is no provider preference.

In one embodiment, the provider preference is based on any, or a combination, of a size of the message and a data rate associated with the identified type of access network, a financial cost to the user associated with transmitting the message having the identified type of content via the identified type of access network, a financial cost to the carrier associated with transmitting the message having the identified type of content via the identified type of access network, a type of user device utilized by the user, or a context in which the user device is utilized.

At a step 418, an amount of the requested content is communicated to the user based on the user preference, the provider preference, or a combination of both. In some embodiments, the amount of content can include the entire content, a description of the content, a title of the content, a limited portion of the content, a modified portion of the content, a header portion of the content, or no portion of the content. Examples of a description of the content include a subject line from an email message and metadata associated with a video or other type of file, among others. Examples of a modified portion of the content include a size-reduced or low-resolution version of an image file, and a framesampled version of a video, such as a GIF file that plays a small number of frames from a video content, among others.

Figure 5:
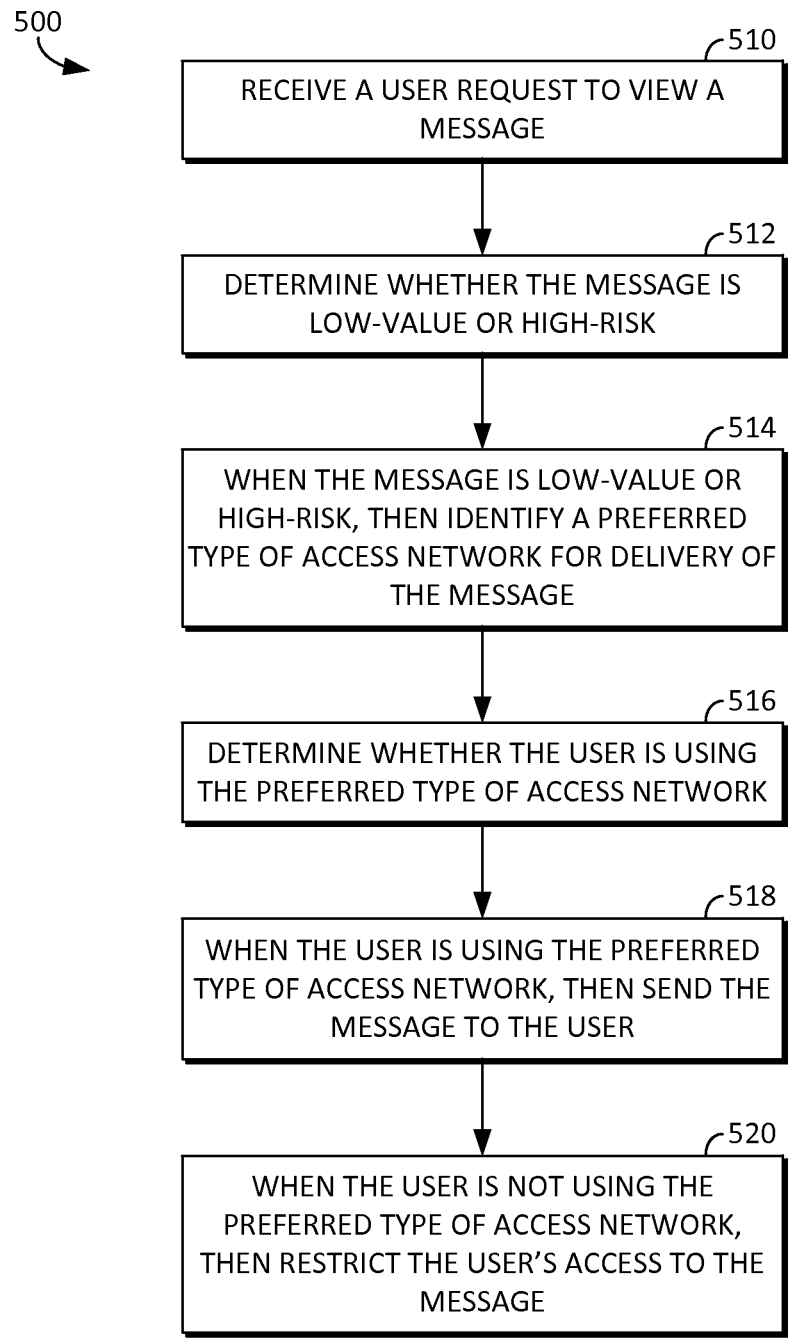
FIG. 5 depicts a flowchart of a method for controlling access to content suitable for use in accordance with an embodiment of the present invention.

Referring now to FIG. 5, a flowchart is depicted of a method for controlling access to content suitable for use in accordance with an embodiment of the present invention, and is generally referred to as method 500.

At a step 510, a request is received from a user, via an access network, to view a message stored at a message service. In an embodiment, a message service includes one or more of an email service, a voicemail service, a short message service (SMS), multimedia message service (MMS) and a rich communications service (RCS), among others. The message service may be associated with the user's telecommunications provider, or with a third-party provider.

At a step 512, a determination is made as to whether the requested message is a low-value message or a high-risk message, or both. In an embodiment, the value level of the message is determined based on the type of message or type of content associated with the message. As described above, messages may be classified as low-value and high-value, or according to other classification schemes such as three or more levels of classification (e.g., low, medium, and high value). A low-value message may include a type of message that is of little or no interest to the user, based on a user-specified preference or the user's past behavior, and may be determined by accessing a user profile. Additionally, in one embodiment, the determination that the message is of low value includes determining that the message value falls within a range of one or more value levels that are associated with having low value.

In an embodiment, the risk level of the message is determined based on one or more factors related to the user, the network, or both. As described above, messages may be classified as low-risk and high-risk, or according to other classification schemes such as three or more levels of classification (e.g., low, medium, and high risk). In an embodiment, the determination that the message is of high risk includes determining that the message risk level falls within a range of one or more risk levels that are associated with having high risk.

At a step 514, when a determination is made that the requested message is a low-value message or a high-risk message, or both, then a preferred type of access network to utilize for delivery of the message is determined. The preferred type of access network may be determined based on user preferences and/or provider preferences, taking into account such factors as content type, content risk level, access network characteristics, among others, as described above.

At a step 516, a determination is made as to whether the user is accessing the message service via the preferred type of access network. In an embodiment, the determination is made by obtaining the access network identifier associated with the user's access network and utilizing the identifier to determine the access-network type from an access-network mapping that maps identifiers of access networks to types of access networks. Once the user's access network type is identified, it can be compared to the preferred access-network type to determine whether the user is utilizing the preferred type of access network.

At a step 518, when the user is accessing the message service via the preferred type of access network, then the message is sent to the user, i.e., to the user's device. In an embodiment, the entire message is sent with no restrictions.

At a step 520, when the user is not accessing the message service via the preferred type of access network, then the user's access to the message is restricted. In one embodiment, restricting the user's access to the message includes refraining from sending any portion of the message to the user. In another embodiment, restricting the user's access to the message includes sending a portion of a message header to the user. Some embodiments restrict the user's access by sending the user a limited portion of the message, a modified portion of the message, and/or a subject or description of the message.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having embodied thereon computer-useable instructions that, when executed by one or more processors, facilitate a method of controlling access to content, the method comprising:

accessing an access-network mapping that maps access-network identifiers to access-network types;

at a server, receiving a request from a user via an access network to access online content, wherein the access network is associated with an access point comprising a router or gateway;

obtaining an access-network identifier that identifies the access point associated with the access network that was utilized by the user to submit the request;

accessing the access-network mapping to determine which access-network type is mapped to the access-network identifier;

based on the access-network identifier and the access-network mapping, identifying an access-network type associated with the access network;

identifying a content type associated with the content;

accessing a database that stores policies which control access to particular content types when accessed via particular access-network types;

identifying one or more policies from the database which control access to the identified content type when accessed via the identified access-network type, wherein the identified one or more policies specify, for the identified content type, a limited portion of the content that is permitted to be transmitted when the identified access-network type is a first type of access network, and an entire portion of the content that is permitted to be transmitted when the identified access-network type is a second type of access network;

at the server, utilizing the identified one or more policies, determining a portion of the content that is permitted to be transmitted based on the identified content type and the identified access-network type, wherein:

when the identified access-network type is the first type of access network, then communicating the limited portion of the content to the user via the access network that was utilized by the user to submit the request, and when the identified access-network type is the second type of access network, then communicating the entire portion of the content to the user via the access network that was utilized by the user to submit the request.

2. The media of claim 1, wherein determining the portion of the content to communicate to the user includes one or more of
   A) determining a value level of the content, or
   B) determining a risk level of the content.

3. The media of claim 2, wherein the value level is an estimation of an amount of value the user places on the content, and wherein determining the value level of the content is based at least on the user's behavior with regard to previous content having the identified content type.

4. The media of claim 2, wherein the risk level indicates an amount of risk associated with delivering the identified content type to the user, and wherein determining the risk level is based at least on one or more of
   A) a size of the content and a data rate associated with the identified access-network type,
   B) a financial cost to the user associated with transmitting the content having the identified content type via the identified access-network type,
   C) a financial cost to the carrier associated with transmitting the content having the identified content type via the identified access-network type,
   D) a type of user device utilized by the user, or
   E) a context in which the user device is utilized.

5. The media of claim 1, wherein the determined portion of the content to communicate to the user includes one or more of
   A) the entire content,
   B) no portion of the content,
   C) a header portion of the content,
   D) a limited portion of the content,
   E) a modified portion of the content, or
   F) a description associated with the content.

6. The media of claim 1, the method further comprising: generating the access-network mapping that maps access-network identifiers to access-network types.

7. One or more non-transitory computer-readable media having embodied thereon computer-useable instructions that, when executed by one or more processors, facilitate a method of controlling access to content communicated by a provider network to a user, the method comprising:
   at a server, receiving a request from a user via an access network to download content;
   determining an identification of a Multipurpose Internet Mail Extensions (MIME) type of the content requested for download by the user, wherein the MIME type specifies a preferred access-network type;
   obtaining an access-network identifier that identifies an access point associated with the access network that was utilized by the user to submit the request;
   accessing an access-network mapping to determine which access-network type is mapped to the access-network identifier, wherein the access-network mapping maps access-network identifiers to access-network types;
   based on the access-network identifier and the access-network mapping, determining an identification of the type of access network utilized by the user to request the content;
   determining whether the type of access network utilized by the user is the preferred access-network type specified by the MIME type associated with the content;
   responsive to determining that the type of access network utilized by the user is the preferred access-network type specified by the MIME type associated with the content, communicating the requested content to the user via the access network that was utilized by the user to submit the request; and
   responsive to determining that the type of access network utilized by the user is not the preferred access-network type specified by the MIME type associated with the content, communicating a limited amount of the requested content to the user via the access network that was utilized by the user to submit the request.

8. One or more non-transitory computer-readable media having embodied thereon computer-useable instructions that, when executed by one or more processors, facilitate a method of controlling access to a message, the method comprising:
   receiving a request from a user device via an access network to view a message stored at a message service;
   determining that the message is a high-risk message with respect to a first type of access network, based on a financial cost to the carrier associated with transmitting the message via the first type of access network;
   responsive to the determination that the message is a high-risk message, identifying a preferred type of access network to utilize for delivery of the message, wherein the message is determined to be a low-risk message with respect to the preferred type of access network, based on a lower financial cost to the carrier associated with transmitting the message via the preferred type of access network than the first type of access network;
   obtaining an access-network identifier that identifies an access point associated with the access network that was utilized by the user to submit the request;
   accessing an access-network mapping to determine which access-network type is mapped to the access-network identifier, wherein the access-network mapping maps access-network identifiers to access-network types;
   based on the access-network identifier and the access-network mapping, determining an identification of the type of access network utilized by the user to request the content;
   determining whether the user is accessing the message service via the preferred type of access network;
   when the user is accessing the message service via the preferred type of access network, then sending the message to the user via the access network that was utilized by the user to submit the request; and
   when the user is not accessing the message service via the preferred type of access network, then restricting the user's access to the message, wherein restricting the user's access to the message includes sending to the user, via the access network that was utilized by the user to submit the request, a portion of a header associated with the message instead of the entire message.

9. The media of claim 8, the method further comprising: generating the access-network mapping that, for each of a plurality of access networks, maps an identifier of the access network to one of a plurality of types of access networks.

10. The media of claim 7, wherein communicating a limited amount of the requested content includes sending to the user a modified portion of the content.

* * * * *